(12) United States Patent
Hu et al.

(10) Patent No.: US 10,176,949 B2
(45) Date of Patent: Jan. 8, 2019

(54) CONTROL APPARATUS FOR RELAY AND CONTROLLING METHOD THEREOF

(71) Applicants: Jian-Wei Hu, Taipei (TW); Chih-Tarng Chuang, Taipei (TW)

(72) Inventors: Jian-Wei Hu, Taipei (TW); Chih-Tarng Chuang, Taipei (TW)

(73) Assignee: COMPAL ELECTRONICS, INC., Taipei (TW)

(*) Notice: Subject to any disclaimer, the term of this patent is extended or adjusted under 35 U.S.C. 154(b) by 321 days.

(21) Appl. No.: 15/272,448

(22) Filed: Sep. 22, 2016

(65) Prior Publication Data

US 2017/0092448 A1 Mar. 30, 2017

Related U.S. Application Data

(60) Provisional application No. 62/232,417, filed on Sep. 24, 2015.

(51) Int. Cl.
| | | |
|---|---|---|
| *H01H 47/18* | (2006.01) | |
| *H01H 47/22* | (2006.01) | |
| *H02H 7/20* | (2006.01) | |
| *H02H 3/093* | (2006.01) | |
| *H02H 3/02* | (2006.01) | |

(52) U.S. Cl.
CPC .......... *H01H 47/18* (2013.01); *H01H 47/223* (2013.01); *H02H 3/093* (2013.01); *H02H 7/20* (2013.01); *H02H 3/021* (2013.01)

(58) Field of Classification Search
CPC .......... H02H 3/021; H02H 3/093; H02H 7/20; H01H 47/18; H01H 47/223
USPC ......................................... 361/91.1
See application file for complete search history.

(56) References Cited

FOREIGN PATENT DOCUMENTS

KR        101253097 B1 * 4/2013

OTHER PUBLICATIONS

Machine translation of Shin Korean Patent Document KR 101253097 B1, Apr. 2013.*

* cited by examiner

*Primary Examiner* — Thienvu Tran
*Assistant Examiner* — Kevin J Comber
(74) *Attorney, Agent, or Firm* — JCIPRNET (57) ABSTRACT

A control apparatus for a relay and controlling method thereof. The controlling method includes: detecting an input voltage of the relay and a current flowing through the relay; obtaining a voltage zero crossing point information according to the input voltage and a reference voltage value; turning on the relay at an initial turn-on time point according to the voltage zero crossing point information, and obtaining a real turn-on time point of the relay according to the current flowing through the relay; obtaining a turn-on delay of the relay according to the initial turn-on time point and the real turn-on time point, and adjusting the initial turn-on time point to obtain a compensated turn-on time point according to the turn-on delay.

19 Claims, 7 Drawing Sheets

CONTROL APPARATUS FOR RELAY AND CONTROLLING METHOD THEREOF

CROSS-REFERENCE TO RELATED APPLICATION

This application claims the priority benefit of U.S. provisional application Ser. No. 62/232,417, filed on Sep. 24, 2015. The entirety of the above-mentioned patent application is hereby incorporated by reference herein and made a part of this specification.

BACKGROUND

Technical Field

The present invention relates to a control apparatus for a relay and a controlling method thereof, and more particularly relates to a control apparatus for a relay and controlling method thereof for suppressing the arc phenomenon.

Description of Related Art

In electronic apparatus, relay is commonly used as a switch, which is capable for controlling the power transmission path to be turned on or turned off by electromagnetic effects. In the application, suppliers of the relay may provide the electrical parameters related to the relay such as turn-on delay and turn-off delay. However, the related parameters such as turn-on delay and turn-off delay of the relay provided by the suppliers are usually presented in a wide range. Accordingly, it is difficult to control the real time point of the relay being actually turned on and turned off when using the relay. In such cases, the relay may be turned on at a time point with a high input voltage value, or be turned off at a time point with a high current flowing through the relay. Each of the above may cause the arc phenomenon on the relay, and further cause the carbonization or even break the connection point of the relay. Therefore, the reliability of the relay and the system including the relay may be decreased, and the overall performance may be affected.

SUMMARY

The present invention provides a control apparatus for a relay and controlling method thereof, which effectively suppress the arc phenomenon caused when the relay is turned on or turned off.

The controlling method of a relay includes: detecting an input voltage of the relay and a current flowing through the relay; obtaining a voltage zero crossing point information according to the input voltage and a reference voltage value; turning on the relay at an initial turn-on time point according to the voltage zero crossing point information, and obtaining a real turn-on time point of the relay according to the current flowing through the relay; obtaining a turn-on delay of the relay according to the initial turn-on time point and the real turn-on time point, and adjusting the initial turn-on time point to obtain a compensated turn-on time point according to the turn-on delay.

In an embodiment of the present invention, after the relay is turned on, the controlling method further includes: obtaining a current zero crossing point information according to the current flowing through the relay and a reference current value; setting an initial turn-off time point for turning off the relay, and obtaining a peak occurrence time point of the current after the relay is turned off; setting a compensation unit time, when the peak occurrence time point is larger than a preset time, adjusting the initial turn-off time point and obtaining a compensated turn-off time point step-by-step according to the compensation unit time.

The control apparatus for a relay includes a voltage detector, a current detector, a driver and a controller. The voltage detector detects an input voltage. The current detector is coupled to the relay and detecting a current flowing through the relay. The driver is coupled to the relay, and driving the relay to be turned on or turned off. The controller is coupled to the voltage detector, the current detector and the driver. The controller is configured for obtaining a current zero crossing point information according to the current flowing through the relay and a reference current value; turning off the relay at an initial turn-off time point according to the current zero crossing point information, and obtaining a peak occurrence time point of the current after the relay is turned off; setting a compensation unit time, when the peak occurrence time point is larger than a preset time, adjusting the initial turn-off time point and obtaining a compensated turn-off time point step-by-step according to the compensation unit time.

Based on the above, the control apparatus for the relay provided by the present invention compensates the turn-on time delay and the turn-off time delay occurring when the relay is being turned on or turned off, so that the relay can be actually turned on at the voltage zero crossing point, and be actually turned off at an appropriate time point. Accordingly, the arc phenomenon caused on the relay may be avoided effectively, and the reliability of the system including the relay may be increased.

To make the above features and advantages of the present invention more comprehensible, several embodiments accompanied with drawings are described in detail as follows.

DESCRIPTION OF THE EMBODIMENTS

Figure 1:
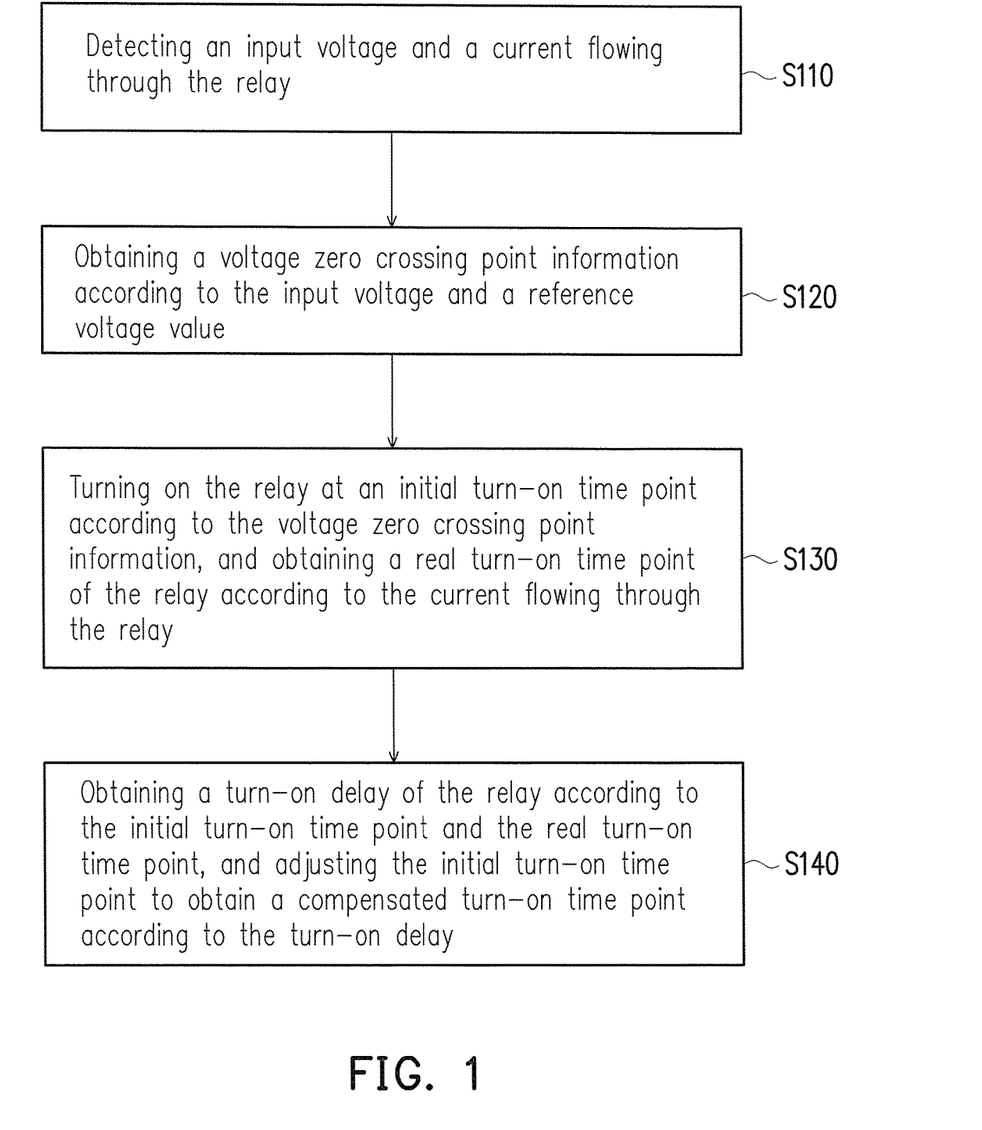
FIG. 1 is a flow chart illustrating a controlling method of a relay according to an embodiment of the present invention.
Figure 2:
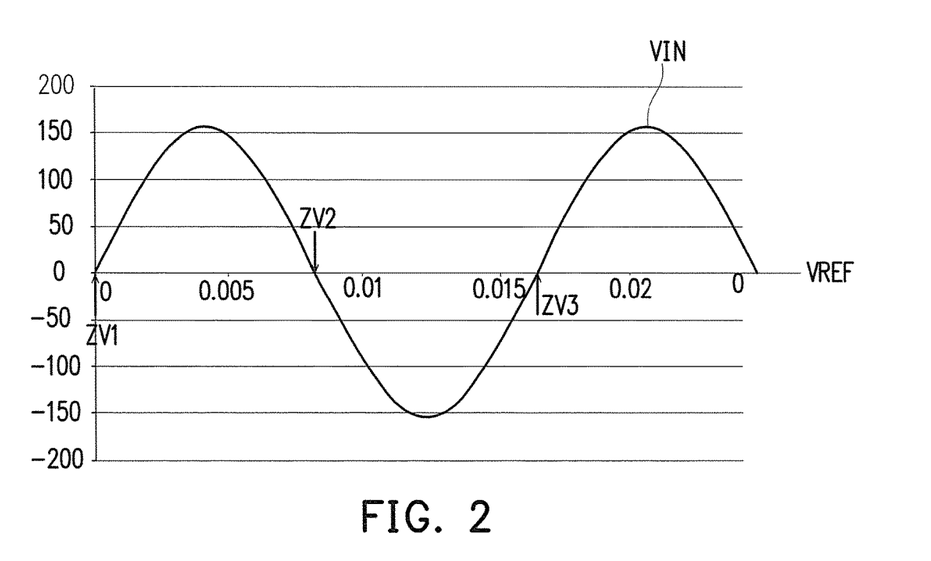
FIG. 2 is a schematic diagram illustrating an obtaining way of a voltage zero crossing point according to the embodiment of the present invention.

Please refer to FIG. 1, FIG. 1 is a flow chart illustrating a controlling method of a relay according to an embodiment of the present invention. The embodiment of FIG. 1 is for turning on a relay. In FIG. 1, an input voltage of the relay and a current flowing through the relay are detected in step S110, and a voltage zero crossing point information is obtained according to the input voltage and a reference voltage value in step S120. Regarding the details of step S120, please refer to FIG. 2. FIG. 2 is a schematic diagram illustrating an obtaining way of a voltage zero crossing point according to the embodiment of the present invention. Taking an input voltage VIN being a sinusoidal wave as an example, for obtaining the voltage zero crossing point, input voltage VIN is compared to a reference voltage value VREF, and the time points at which input voltage VIN crosses the reference voltage value VREF are found out and being taken as the related information of voltage zero crossing points ZV1 to ZV3.

In FIG. 2, the reference voltage value VREF may equal to a voltage value of the ground voltage (e.g., 0 volt), or may be a nonzero voltage, which is not limited herein. In addition, taking the deviations of the DC (direct current) signals for system sampling into account, the reference voltage value VREF may be a reference value adding a dynamic distribution range.

As depicted in FIG. 2, two adjacent voltage zero crossing points (e.g., the voltage zero crossing point ZV1 and voltage zero crossing point ZV2) are separated by half period of the input voltage VIN. Accordingly, the time points of the other voltage zero crossing points may be calculated by the time point of one of the voltage zero crossing points ZV1 to ZV3. The time points corresponding to the voltage zero crossing points ZV1 to ZV3 may be taken as the voltage zero crossing point information.

Figure 3:
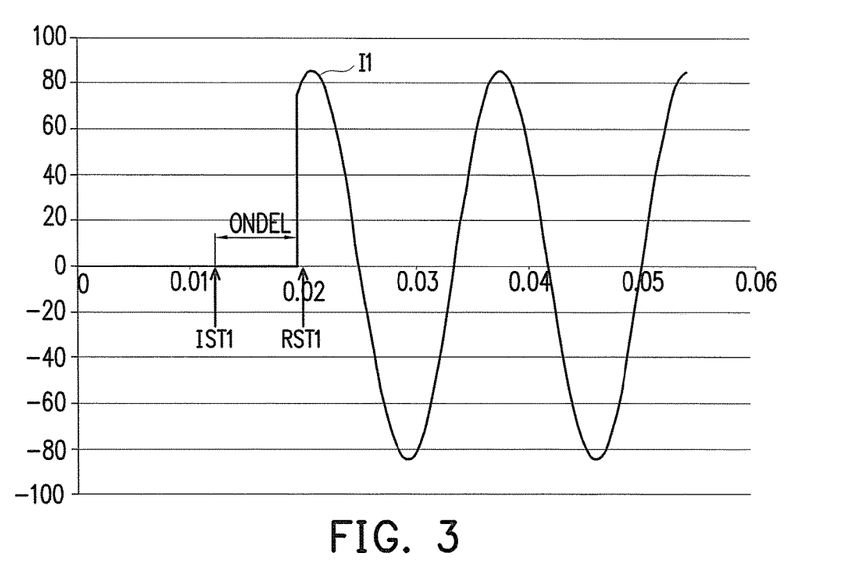
FIG. 3 is a schematic diagram illustrating an obtaining way of a turn-on time delay of the relay according to the embodiment of the present invention.

Please refer to FIG. 1 again, after the voltage zero crossing point information of the input voltage is obtained, the relay is turned on at an initial turn-on time point according to the voltage zero crossing point information, and a real turn-on time point of the relay is obtained according to the current flowing through the relay in step S130. Then, a turn-on delay of the relay is obtained according to the initial turn-on time point and the real turn-on time point, and the initial turn-on time point is adjusted according to the turn-on delay to obtain a compensated turn-on time point in step S140. Regarding the implementation details, please refer to FIG. 3. FIG. 3 is a schematic diagram illustrating an obtaining way of a turn-on time delay of the relay according to the embodiment of the present invention. In which, an initial turn-on time point IST1 is set according to the voltage zero crossing point information, and the relay may start being turned on at the initial turn-on time point IST1 according to the received driving signal. It is noted that, at the initial turn-on time point IST1, since the relay has not been actually turned on, current I1 flowing through the relay is almost zero thus being unable to be detected. At a time point RST1, the current I1 flowing through the relay can be actually detected, which means that the relay is actually turned on at this time, therefore the time point RST1 is the real turn-on time point of the relay.

Accordingly, it can be known that the turn-on time delay ONDEL of the relay may be obtained by calculating a difference between the time point RST1 and the initial turn-on time point IST1. Thus, the compensated turn-on time point may be calculated according to the initial turn-on time point IST1 and the turn-on time delay ONDEL. Therefore, in next period, the relay may be driven to be turned on using the compensated turn-on time point, so that the relay may be actually turned on at the voltage zero crossing point, and the arc phenomenon may be suppressed effectively.

Figure 4:
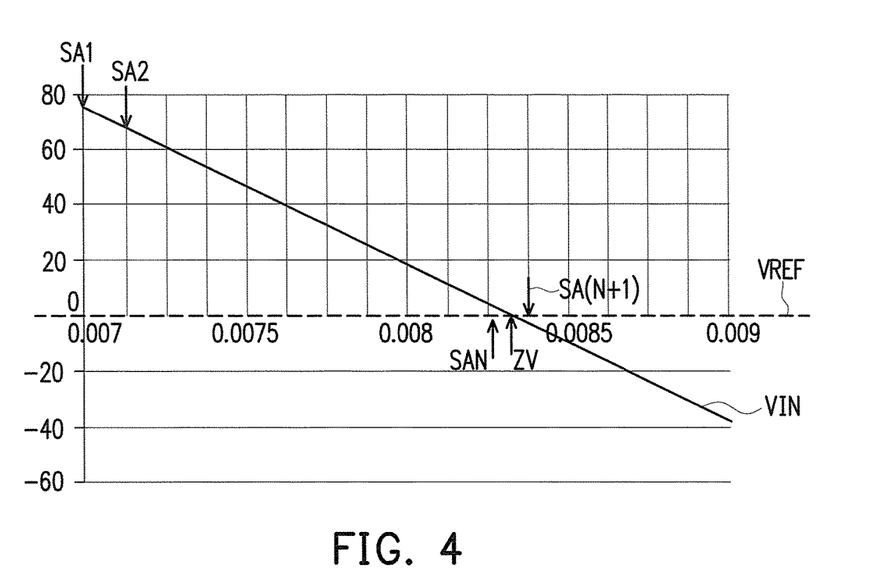
FIG. 4 is a schematic diagram illustrating an implementation of obtaining the voltage zero crossing point information according to the embodiment of the present invention.

In the following, please refer to FIG. 4. FIG. 4 is a schematic diagram illustrating an implementation of obtaining the voltage zero crossing point information according to the embodiment of the present invention. In FIG. 4, sampling operations of a plurality of sampling time points SA1 to SA(N+1) are performed on the input voltage VIN at consecutive time points to respectively obtain a plurality of voltage sample values. By comparing (e.g., subtracting) the voltage sample values and the reference voltage value VREF, a plurality of differences may be obtained. Within the obtained differences, if a difference corresponds to the sampling time point SAN is positive, and another adjacent difference corresponds to the sampling time point SA(N+1) is negative instead, which means that voltage zero crossing point ZV takes place between the sampling time points SAN and SA(N+1). Accordingly, one of the sampling time points SAN and SA(N+1) may be taken as the voltage zero crossing point information.

More precisely, to simplify the calculation complexity of the aforementioned operations, sampling time points SA1 to SA(N+1) may be numbered respectively in the embodiment of the present invention, and the voltage zero crossing point information may be obtained by calculating the numerical size relationship between the reference voltage value VREF and the voltage sample value corresponding to each number.

Figure 5:
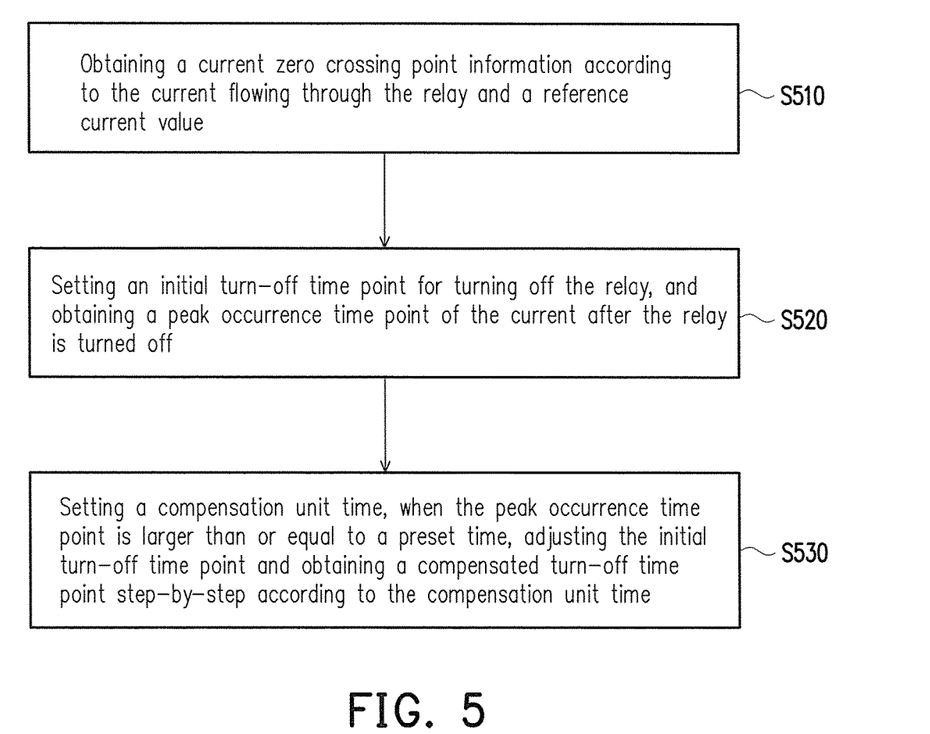
FIG. 5 is a flow chart illustrating a controlling method of a relay according to another embodiment of the present invention.

Please refer to FIG. 5, FIG. 5 is a flow chart illustrating a controlling method of a relay according to another embodiment of the present invention. The embodiment of FIG. 5 is for turning off a turned-on relay. A current flowing through the relay is detected, and a current zero crossing point information is obtained according to the current flowing through the relay and a reference current value in step S510. In which, the details of step S510 may be realized according to the obtaining way of the voltage zero crossing point information in the embodiment of the present invention (as depicted in FIG. 3 and FIG. 4).

Figure 6A:
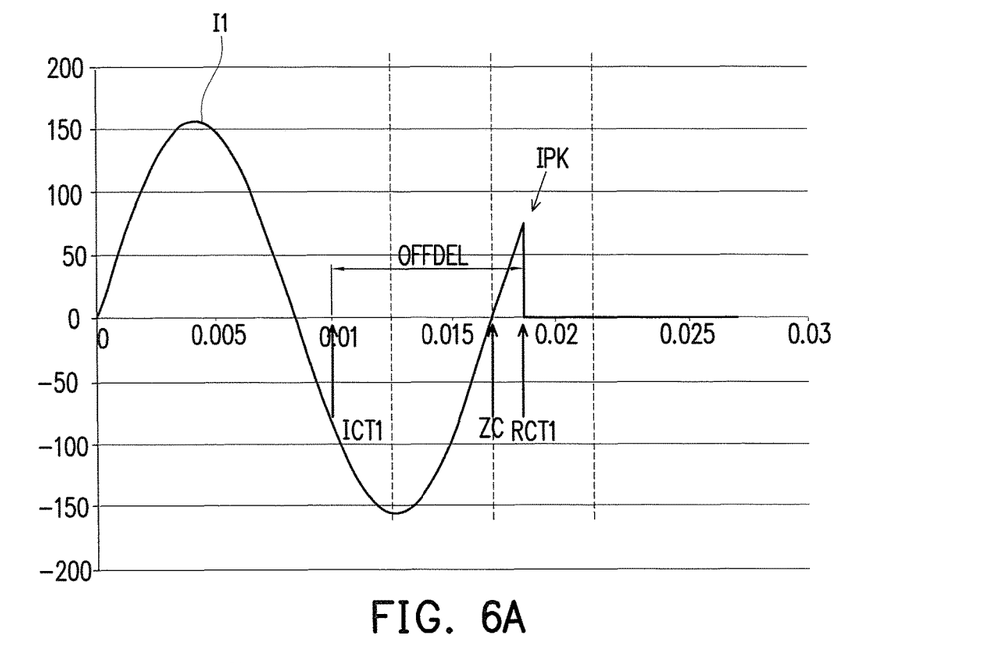
FIG. 6A and FIG. 6B are schematic diagrams illustrating current waveforms after the relay is being turned off according to the embodiment of the present invention.
Figure 6B:
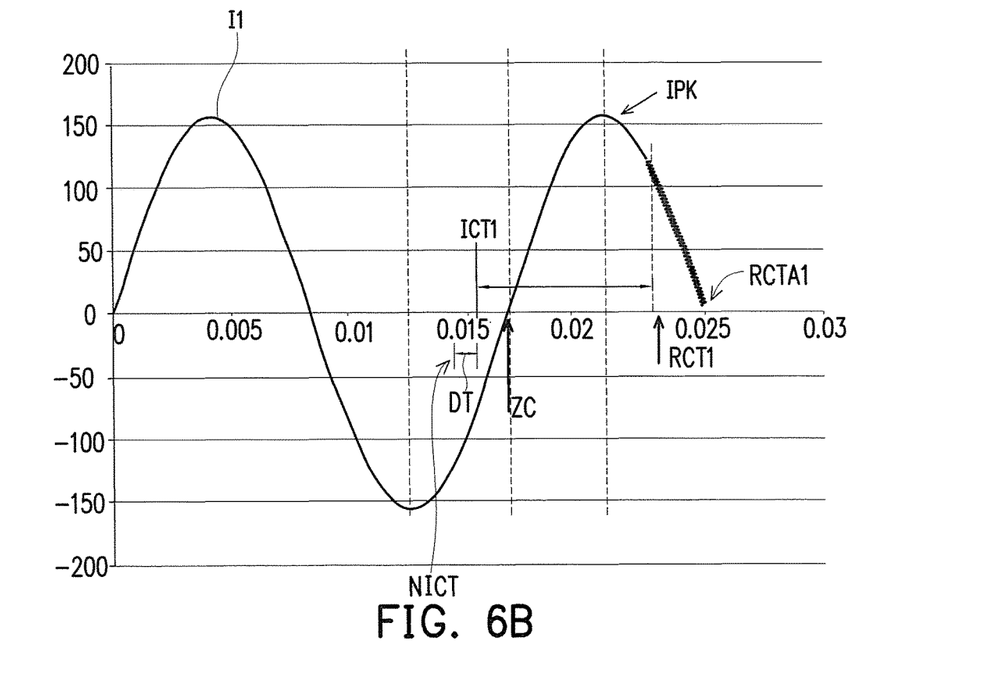

Then, an initial turn-off time point of the relay is set, and a command is issued at the initial turn-off time point to drive the relay to perform an operation of turning off in step S520. In which, the initial turn-off time point may be set according to the current zero crossing point information. According to the size of the turn-off time delay of the relay, there are two possible patterns of the current flowing through the relay. FIG. 6A and FIG. 6B are schematic diagrams illustrating current waveforms after the relay is being turned off according to the embodiment of the present invention.

In FIG. 6A, the relay receives the command at an initial turn-off time point ICT1 to start performing an operation of turning off. At a real turn-off time point RCT1 after a turn-off time delay OFFDEL, the relay is actually turned off. In the present embodiment, after the initial turn-off time point ICT1, the current flowing through the relay is continuously detected, and an occurrence time point of a peak current IPK is obtained, so as to determine whether a time difference of the occurrence time point of the peak current IPK and the closest current zero crossing point ZC is larger than quarter period of the input voltage (to determine the difference is larger than a preset time). As depicted in FIG. 6A, the difference of the occurrence time point of the peak current IPK and the closest current zero crossing point ZC is not larger than quarter period of the input voltage, therefore the arc phenomenon does not occur in this case. Accordingly, the real turn-off time point RCT1 of the relay may be successfully detected without any effects of the arc phenomenon, and the turn-off time delay OFFDEL of the relay may be obtained by calculating a time difference between the initial turn-off time point ICT1 and the real turn-off time point RCT1.

After the turn-off time delay OFFDEL of the relay is obtained, the initial turn-off time point ICT1 may be compensated according to the turn-off time delay OFFDEL. Specifically, a time difference between the initial turn-off time point ICT1 and current zero crossing point ZC is taken as the turn-off time delay OFFDEL. Therefore, the relay is actually turned off at the time point of the current zero crossing point ZC.

On the other hand, as depicted in FIG. 6B, the difference of the occurrence time point of the peak current IPK and the closest current zero crossing point ZC is larger than or equal to quarter period of the input voltage, therefore the arc phenomenon probably occurs in this case. In this case, the detected real turn-off time point RCTA1 of the relay is not likely to be the true real turn-off time point RCT1. As a result, the real turn-off time point RCT1 of the relay is unable to be detected.

As per the aforementioned problem, please refer to FIG. 5 again. When the initial turn-off time point ICT1 needs to be compensated, step S530 may be performed to set the compensation unit time DT, and adjust the initial turn-off time point ICT1 to obtain the compensated turn-off time point NICT step-by-step according to the compensation unit time DT when the difference of the peak occurrence time point of the peak current IPK and the closest current zero crossing point ZC is larger than or equal to quarter period of the input voltage. The aforementioned adjustment is performed step-by-step. Specifically, the compensated turn-off time point NICT is obtained by subtracting the compensation unit time DT from the initial turn-off time point ICT1 first, and the relay is driven to be turned off according to the compensated turn-off time point NICT in the next operation of turning off the relay. If the arc phenomenon as shown in FIG. 6B still occurs, the compensated turn-off time point NICT should be adjusted again according to compensation unit time DT.

By one or more times of compensation operations, the arc phenomenon is not going to occur anymore if the difference of the occurrence time point of the peak current IPK and the closest current zero crossing point ZC is smaller than quarter period of the input voltage. In addition, the real turn-off time point RCT1 of the relay may be detected without any effects of the arc phenomenon (as the situation of FIG. 6A). Accordingly, the turn-off time delay OFFDEL of the relay may be obtained by calculating the time difference between the initial turn-off time point ICT1 and the real turn-off time point RCT1, and one-time compensation operation may be performed on the last compensated turn-off time point NICT according to the turn-off time delay OFFDEL. That is, the initial turn-off time point ICT1 of the relay is set to equal to a difference of subtracting turn-off time delay OFFDEL of the relay from the last compensated turn-off time point NICT.

Figure 7:
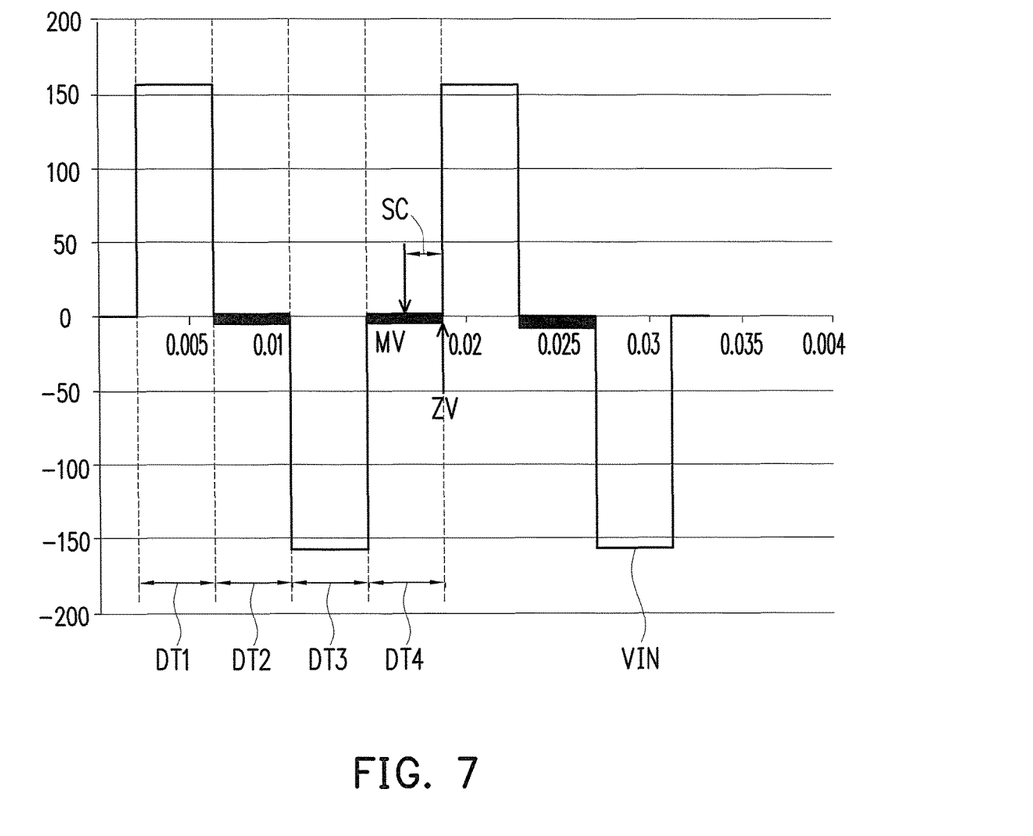
FIG. 7 is a schematic diagram illustrating a controlling method of a relay according to still another embodiment of the present invention.

In the following, please refer to FIG. 7. FIG. 7 is a schematic diagram illustrating a controlling method of a relay according to still another embodiment of the present invention. In which, the input voltage is a square wave instead of a sinusoidal wave in FIG. 7. One period of square-wave input voltage VIN includes four sub-periods DT1 to DT4, where the sub-periods DT2 and DT4 are silence times. It should be noted that, in case of the waveform of the input voltage VIN being the square wave, it is not appropriate to actually turn on the relay at voltage zero crossing point and/or actually turn off the same at current zero crossing point. Accordingly, in case of the waveform of the input voltage VIN being the square wave, the real turn-on time point and the real turn-off time point need to be set at a center point MV of the sub-periods being the silent times. That is, the compensated turn-on time point for turning on the relay may be adjusted according to voltage zero crossing point ZV (e.g., half of the silence time period SC earlier), and the compensated turn-off time point for turning off the relay may be adjusted according to similar principles.

Figure 8:
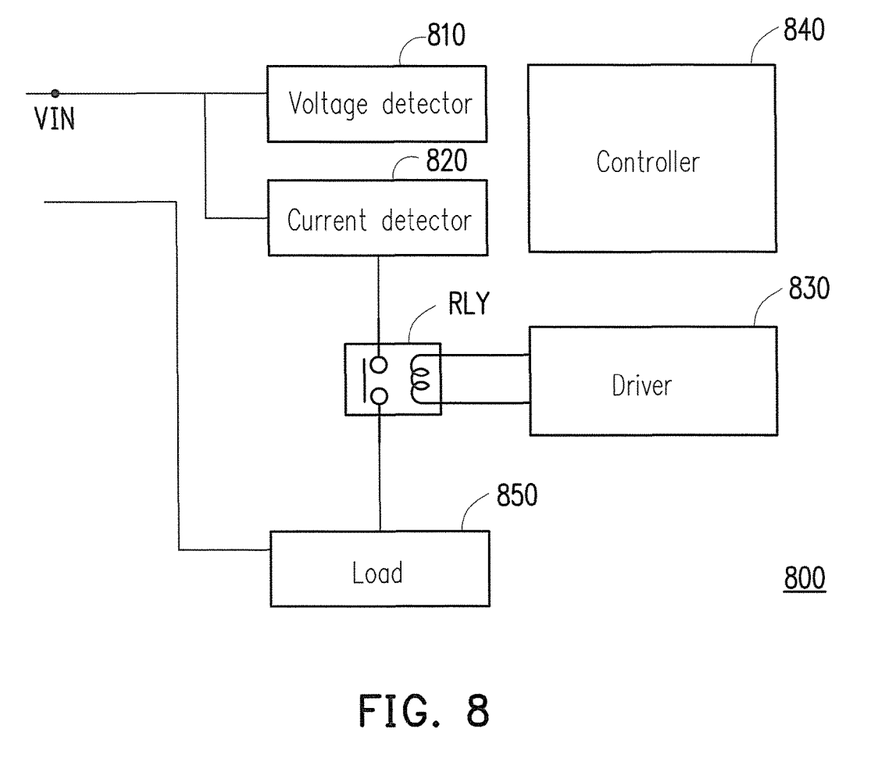
FIG. 8 is a schematic diagram illustrating a control apparatus for a relay according to an embodiment of the present invention.

In the following, please refer to FIG. 8. FIG. 8 is a schematic diagram illustrating a control apparatus for a relay according to an embodiment of the present invention. Control apparatus 800 for a relay RLY includes a voltage detector 810, a current detector 820, a driver 830 and a controller 840. The voltage detector 810 detects the input voltage VIN. The current detector 820 is coupled to the relay RLY and detecting a current flowing through the relay RLY. The driver 830 is coupled to the relay RLY, and drives the relay RLY to make the relay RLY be turned on or turned off. The controller 840 is coupled to the voltage detector 810, the current detector 820 and the driver 830. The controller 840 may control the operations of turning on and turning off the relay RLY according to the aforementioned multiple embodiments.

It should be mentioned that, in the present embodiment, controller 840 can further determine the turn-off time of replay RLY according to the type of a load 850. In which, when the input voltage is a sinusoidal wave and the current requirement (an amplitude of the current flowing through the relay RLY) of the load 850 is smaller than a reference value, the initial turn-off time point of the relay RLY may be compensated according to the voltage zero crossing point information as depicted in FIG. 2, so that the real turn-off time point of the relay RLY may substantially equal to the time point of the voltage zero crossing point.

In addition, when the current requirement (an amplitude of the current flowing through relay RLY) of the load 850 is larger than the said reference value and the load 850 is a capacitive load, the controller 840 may also compensate the initial turn-off time point of the relay RLY according to the voltage zero crossing point information as depicted in FIG. 2, so that the real turn-off time point of the relay RLY may substantially equal to the time point of the voltage zero crossing point. On the other hand, when the current requirement (an amplitude of the current flowing through relay RLY) of the load 850 is larger than the said reference value and the load 850 is an inductive load or a resistive load, controller 840 may turn off the relay RLY according to compensated turn-off time point NICT as depicted in FIG. 6A or FIG. 6B, so that the real turn-off time point of the relay RLY may occurs at the current zero crossing point.

In addition, when the input voltage is a square wave and the current requirement (an amplitude of the current flowing through the relay RLY) of the load 850 is smaller than a reference value, the initial turn-off time point of the relay RLY may be compensated according to the voltage zero crossing point information as depicted in FIG. 2 and the information of the center point MV of the sub-periods being the silence times as depicted in FIG. 7, so that the real turn-off time point of the relay RLY may substantially occur at the center point MV of a sub-period being the silence time.

In addition, when the input voltage is a square wave, the current requirement (an amplitude of the current flowing through relay RLY) of the load 850 is larger than the said reference value, and the load 850 is a capacitive load, the controller 840 may also compensate the initial turn-off time point of the relay RLY according to the voltage zero crossing point information as depicted in FIG. 2 and the information of the center point MV of the sub-periods being the silence times as depicted in FIG. 7. On the other hand, when the current requirement (an amplitude of the current flowing through the relay RLY) of the load 850 is larger than the said reference value and the load 850 is an inductive load or a resistive load, the controller 840 may set the initial turn-off time point of the relay RLY according to the compensated turn-off time point NICT as depicted in FIG. 6A or FIG. 6B. That is, the real turn-off time point of the relay RLY may occur at the center point MV of a sub-period being the silence time.

Moreover, controller 840 further detects whether an overvoltage phenomenon and an overcurrent phenomenon occur on the relay RLY. The controller 840 issues a command to make the driver 830 turns off the relay RLY when at least one of the overvoltage phenomenon and the overcurrent phenomenon occurs, so as to ensure the system's safety.

In summary, by using the control apparatus for a relay and the controlling method thereof provided in the invention, it is assured that the arc phenomenon does not occur when turning on and turning off the relay. Accordingly, the operation stability of the relay may be improved, and the performance of the system including the relay may be also improved.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A controlling method of a relay, comprising:
    detecting an input voltage of the relay and a current flowing through the relay;
    obtaining a voltage zero crossing point information according to the input voltage and a reference voltage value;
    turning on the relay at an initial turn-on time point according to the voltage zero crossing point information, and obtaining a real turn-on time point of the relay according to the current flowing through the relay; and
    obtaining a turn-on delay of the relay according to the initial turn-on time point and the real turn-on time point, and adjusting the initial turn-on time point to obtain a compensated turn-on time point according to the turn-on delay,
    wherein after the relay is turned on, the controlling method further comprises:
    obtaining a current zero crossing point information according to the current flowing through the relay and a reference current value;
    setting an initial turn-off time point for turning off the relay, and obtaining a peak occurrence time point of the current after the relay is turned off;
    setting a compensation unit time, when the peak occurrence time point is larger than or equal to a preset time, adjusting the initial turn-off time point and obtaining a compensated turn-off time point step-by-step according to the compensation unit time.

2. The controlling method of the relay as claimed in claim 1, wherein the controlling method further comprises:
    when the peak occurrence time point is smaller than the preset time, calculating a time difference between the initial turn-off time point and a real turn-off time point of the relay to obtain a turn-off time delay of the relay.

3. The controlling method of the relay as claimed in claim 1, wherein the step of detecting the input voltage of the relay and the current flowing through the relay comprises:
    sequentially sampling the input voltage to obtain a plurality of voltage sample values; and
    sequentially sampling the current to obtain a plurality of current sample values.

4. The controlling method of the relay as claimed in claim 3, wherein the step of obtaining the current zero crossing point information according to the current flowing through the relay and the reference current value comprises:
    comparing the current sample values to the reference current value to obtain a plurality of comparison results; and
    obtaining the current zero crossing point information according to the comparison results.

5. The controlling method of the relay as claimed in claim 1, wherein the step of obtaining the voltage zero crossing point information according to the input voltage and the reference voltage value comprises:
    comparing the voltage sample values to the reference voltage value to obtain a plurality of comparison results; and
    obtaining the voltage zero crossing point information according to the comparison results.

6. The controlling method of the relay as claimed in claim 1, wherein when the input voltage is a square-wave power voltage with a plurality of periodic silence times, adjusting the compensated turn-off time point and the compensated turn-on time point according to a time length of the silence time.

7. The controlling method of the relay as claimed in claim 1, wherein after the relay is turned on, the controlling method further comprises:
    when an amplitude of the current flowing through the relay is smaller than a reference value, turning off the relay according to the voltage zero crossing point information.

8. The controlling method of the relay as claimed in claim 7, wherein after the relay is turned on, the controlling method further comprises:
    when the amplitude of the current flowing through the relay is larger than the reference value and a load of the relay is a capacitive load, turning off the relay according to the voltage zero crossing point information.

9. The controlling method of the relay as claimed in claim 7, wherein after the relay is turned on, the controlling method further comprises:
    when the amplitude of the current flowing through the relay is larger than the reference value and a load of the relay is an inductive load or a resistive load, turning off the relay according to the compensated turn-off time point.

10. A control apparatus for a relay, comprising:
    a voltage detector, detecting an input voltage;
    a current detector, coupled to the relay and detecting a current flowing through the relay;
    a driver, coupled to the relay and driving the relay to be turned on or turned off; and
    a controller, coupled to the voltage detector, the current detector and the driver, wherein the controller is configured for:
    obtaining a voltage zero crossing point information according to the input voltage and a reference voltage value;
    turning on the relay at an initial turn-on time point according to the voltage zero crossing point information, and obtaining a real turn-on time point of the relay according to the current flowing through the relay; and obtaining a turn-on delay of the relay according to the initial turn-on time point and the real turn-on time point, and adjusting the initial turn-on time point to obtain a compensated turn-on time point according to the turn-on delay;

wherein after the relay is turned on, the controller is further configured for:

obtaining a current zero crossing point information according to the current flowing through the relay and a reference current value;

setting an initial turn-off time point for turning off the relay, and obtaining a peak occurrence time point of the current after the relay is turned off; and setting a compensation unit time, adjusting the initial turn-off time point and obtaining a compensated turn-off time point step-by-step according to the compensation unit time when the peak occurrence time point is larger than a preset time.

11. The control apparatus for the relay as claimed in claim 10, wherein the controller is further configured for:

calculating a time difference between the initial turn-off time point and a real turn-off time point of the relay to obtain a turn-off time delay of the relay when the peak occurrence time point is smaller than the preset time.

12. The control apparatus for the relay as claimed in claim 10, wherein the voltage detector sequentially samples the input voltage to obtain a plurality of voltage sample values, and the current detector sequentially samples the current to obtain a plurality of current sample values.

13. The control apparatus for the relay as claimed in claim 12, wherein the controller compares the current sample values to the reference current value to obtain a plurality of comparison results, and obtains the current zero crossing point information according to the comparison results.

14. The control apparatus for the relay as claimed in claim 12, wherein the controller compares the voltage sample values to the reference voltage value to obtain a plurality of comparison results, and obtains the voltage zero crossing point information according to the comparison results.

15. The control apparatus for the relay as claimed in claim 10, wherein when the input voltage is a square-wave power voltage with a plurality of periodic silence times, the controller further adjusts the compensated turn-off time point and the compensated turn-on time point according to a time length of the silence time.

16. The control apparatus for the relay as claimed in claim 10, wherein after the relay is turned on, the controller further turns off the relay according to the voltage zero crossing point information when an amplitude of the current flowing through the relay is smaller than a reference value.

17. The control apparatus for the relay as claimed in claim 16, wherein after the relay is turned on, the controller turns off the relay according to the voltage zero crossing point information when the amplitude of the current flowing through the relay is larger than the reference value and a load of the relay is a capacitive load.

18. The control apparatus for the relay as claimed in claim 16, wherein after the relay is turned on, the controller turns off the relay according to the compensated turn-off time point when the amplitude of the current flowing through the relay is larger than the reference value and a load of the relay is an inductive load or a resistive load.

19. The control apparatus for the relay as claimed in claim 10, wherein the controller further detects whether an overvoltage phenomenon and an overcurrent phenomenon occur on the relay, and turns off the relay when at least one of the overvoltage phenomenon and the overcurrent phenomenon occurs.

* * * * *